(12) United States Patent
Lee

(10) Patent No.: US 9,344,704 B2
(45) Date of Patent: May 17, 2016

(54) METHOD OF RECORDING AND REPLAYING VIDEO DATA, AND DISPLAY DEVICE USING THE SAME

(75) Inventor: Hyunggon Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 977 days.

(21) Appl. No.: 13/508,795

(22) PCT Filed: Oct. 29, 2010

(86) PCT No.: PCT/KR2010/007514
§ 371 (c)(1),
(2), (4) Date: May 9, 2012

(87) PCT Pub. No.: WO2011/059193
PCT Pub. Date: May 19, 2011

(65) Prior Publication Data
US 2012/0224832 A1  Sep. 6, 2012

Related U.S. Application Data (60) Provisional application No. 61/259,651, filed on Nov. 10, 2009.

(51) Int. Cl.
*H04N 5/84* (2006.01)
*H04N 13/00* (2006.01)
(Continued)

(52) U.S. Cl.
CPC .......... *H04N 13/0055* (2013.01); *G11B 27/034* (2013.01); *G11B 27/105* (2013.01); *G11B 27/329* (2013.01); *H04N 13/0029* (2013.01); *H04N 13/0048* (2013.01); *H04N 13/0066* (2013.01); *H04N 13/0497* (2013.01); *H04N 21/4147* (2013.01); *H04N 21/431* (2013.01);
(Continued)

(58) Field of Classification Search
CPC .......... H04N 13/0055; H04N 13/0029; H04N 13/004; H04N 13/0066; H04N 13/0497; H04N 21/4147; H04N 21/431; H04N 21/44008; H04N 21/440236; H04N 21/8153; H04N 13/0048; G11B 27/105; G11B 27/034; G11B 27/329
See application file for complete search history.

(56) References Cited

U.S. PATENT DOCUMENTS

2003/0177495 A1* 9/2003 Needham et al. ............... 725/55
2006/0279630 A1  12/2006 Aggarwal et al.
(Continued)

FOREIGN PATENT DOCUMENTS

EP   1 501 318 A1   1/2005
EP   1 617 684 A1   1/2006

OTHER PUBLICATIONS

Wimmer, Peter: 3dtv.at "Stereoscopic Player and Stereoscopic Multiplexer"; S3D-Today, Munich, Germany; Nov. 27-28, 2006; URL:http://3dtv.at/Downloads/S3DToday2006 Retrieved from the Internet on Jun. 15, 2011 (XP-002641946).
(Continued)

*Primary Examiner* — Tat Chio
(74) *Attorney, Agent, or Firm* — Ked & Associates, LLP (57) ABSTRACT

Provided are a method of recording video data, a method of replaying a video data, and a display device using the same. The method of recording video data receives and stores data provided from the outside, determines whether the received video data is 3D video data, sets a video format for replaying the 3D video data when the received video data is the 3D video data, and stores a video type of the 3D video data and the set video format.

18 Claims, 5 Drawing Sheets

(51) Int. Cl.
- H04N 13/04 (2006.01)
- G11B 27/10 (2006.01)
- G11B 27/034 (2006.01)
- G11B 27/32 (2006.01)
- H04N 21/4147 (2011.01)
- H04N 21/431 (2011.01)
- H04N 21/44 (2011.01)
- H04N 21/4402 (2011.01)
- H04N 21/81 (2011.01)

(52) U.S. Cl.
CPC . H04N 21/44008 (2013.01); H04N 21/440236 (2013.01); H04N 21/8153 (2013.01); *H04N 13/004* (2013.01)

(56) References Cited

U.S. PATENT DOCUMENTS

| | | | |
|---|---|---|---|
| 2008/0031595 A1* | 2/2008 | Cho | 386/108 |
| 2008/0291279 A1 | 11/2008 | Samarasekera et al. | |
| 2009/0237508 A1 | 9/2009 | Arpa et al. | |
| 2010/0020158 A1* | 1/2010 | Oshima et al. | 348/42 |
| 2010/0232767 A1* | 9/2010 | Sasaki et al. | 386/108 |

OTHER PUBLICATIONS

European Search Report dated Apr. 24, 2013 issued in Application No. 10 83 0126.

Wimmer, Peter: "Stereoscopic Player and Stereoscopic Multiplexer: A Computer—Based System for Stereoscopic Video Playback and Recording"; SPIE vol. 5665, Jun. 14, 2005; Stereoscopic Displays and Virtual Reality Systems XII; SPIE and IS&T; pp. 400-411.

Chinese Office Action dated Mar. 25, 2014 issued in Application No. 201080060726.4.

International Search Report issued in PCT Application No. PCT/KR2010/007514 dated Jul. 18, 2011.

S. Wurmlin, et al., "3D Video Recorder," Proceedings of the 10th Pacific Conference on Computer Graphics and Applications, 2002.

* cited by examiner

METHOD OF RECORDING AND REPLAYING VIDEO DATA, AND DISPLAY DEVICE USING THE SAME

CROSS-REFERENCE TO RELATED PATENT APPLICATIONS

This application is a U.S. National Stage Application under 35 U.S.C. 0371 of PCT Application No. PCT/KR2010/007514, filed Oct. 29, 2010, which claims priority to U.S. Provisional Application No. 61/259,651, filed Nov. 10, 2009.

TECHNICAL FIELD

The present disclosure relates to a method of recording video data, a method of replaying a video data, and a display device using the same.

BACKGROUND ART

Recently, while providing of digital broadcasting is widely being expanded, a Personal Video Recording (PVR) function or a Digital Video Recording (DVR) function replacing the existing Video Tape Recorder (VTR) function is being applied to display devices.

A Personal Video Recorder (PVR) is a personal digital video recorder that records information in a hard disk and replays the information. Unlike a Video Cassette Recorder (VCR) that stores a video signal in a magnetic tape, the PVR is a new conceptual digital recorder that records information in a hard disk and replays the information.

Personal video recorders may record a broadcasting program of a certain duration according to a capacity through a hard disk drive that is built in a set-top box or the body of a television (TV), even without a VCR.

The fundamental function of each of PVRs has no large difference with respect to the existing VCRs in that it stores a program sent from a broadcasting station and then replays the stored program. However, the each PVR has a difference with respect to the existing VCRs in that it records information in a hard disk, replays the recorded information in the same file replay scheme of that of computers, and includes a Central Processing Unit (CPU) for replay, a memory chip storing software and a large-capacity hard disk storing an Operating System (OS).

DISCLOSURE OF INVENTION

Technical Problem

TVs having a DVR function may perform record while replaying Three-Dimensional (3D) video. In viewing of the 3D video, setting of the TVs is required to be suitable for a video format. Even when recorded 3D video is again replayed, it is inconvenient to again perform setting of the TVs based on a video format.

Solution to Problem

Embodiments provide a method of recording video data, a method of replaying a video data and a display device using the same, which set a video format when replaying 3D video without separate setting.

In one embodiment, a method of recording video data in a display device includes: receiving and storing video data provided from the outside; determining whether the received video data is Three-Dimensional (3D) video data; setting a video format for replaying the 3D video data when the received video data is the 3D video data; and storing a video type of the 3D video data and the set video format.

In another embodiment, a method of replaying video data in a display device includes: receiving a replay request signal for recorded video data; determining a video type of the video data in response to the replay request signal; determining whether a video format for replaying Three-Dimensional (3D) video data is stored in header information of the 3D video data, when the video type of the video data is the 3D video data; and replaying the 3D video data according to the stored video format, when the video format is stored.

In further another embodiment, a display device includes: a receiver receiving video data provided from the outside; a controller determining whether the received video data is Three-Dimensional (3D) video data, and setting a video format for replaying the 3D video data when the received video data is the 3D video data; a storage unit storing the video data, the video format which is set by the controller, and a video type of the 3D video data; and a display unit outputting the video data.

In still further another embodiment, a video bit stream structure includes: a header region including information on a video type of video data, and video format information for replaying Three-Dimensional (3D) video data when the video type is the 3D video data; and a payload region recording the 3D video data which is replayed according to the video format information.

In much further another embodiment, the method of recording video data and the method of replaying video data are implemented as a computer-readable recording medium storing a program for executing the methods in the computer.

The details of one or more embodiments are set forth in the accompanying drawings and the description below. Other features will be apparent from the description and drawings, and from the claims.

Advantageous Effects of Invention

According to an embodiment, as described above, by visually displaying information on 3D broadcasting at a time when 3D broadcasting is practically applied in the future, the display device provides service that allows a user to easily recognize whether a stored program is 3D video data, thereby maximizing the user's convenience.

BEST MODE FOR CARRYING OUT THE INVENTION

Hereinafter, a broadcasting reception method and apparatus according to embodiments will be described in detail with reference to the accompanying drawings.

Figure 1:
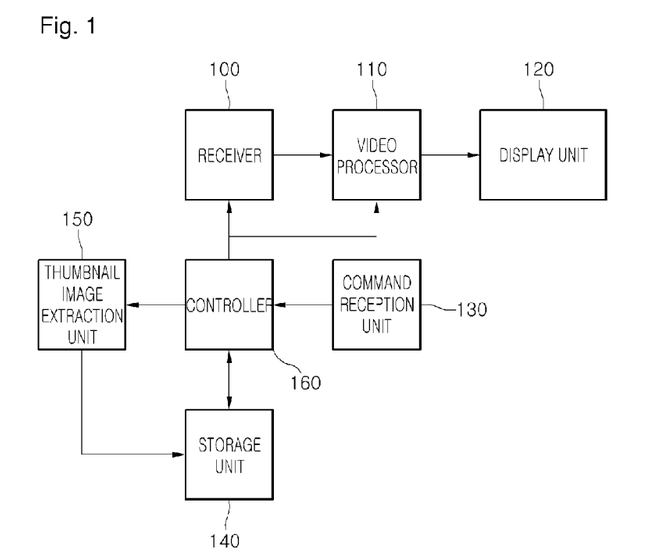
FIG. 1 is a block diagram illustrating a structure of a display device of recording a broadcasting program, according to an embodiment.

FIG. 1 is a block diagram illustrating a structure of a display device of recording a broadcasting program, according to an embodiment.

As illustrated in FIG. 1, a display device according to an embodiment includes a receiver 100, a video processor 110, a display unit 120, a command reception unit 130, a storage unit 140, a thumbnail image extraction unit 150, and a controller 160.

The receiver 100 receives the broadcasting program of a channel that is selected by a user, among broadcasting programs provided from the outside. The received broadcasting program may include Two-Dimensional (2D) video data and 3D video data.

That is, a digital broadcasting signal is transmitted in a transport stream type that is packaged by time-division multiplexing a video signal, an audio signal and additional data.

The receiver 100 receives a broadcasting signal, which is transmitted from the outside, through an antenna. The receiver 100 may include a tuner that tunes a broadcasting signal having a frequency band which corresponds to a tuning control signal according to the tuning control signal of the controller 160 to be described below, a demodulator that outputs the tuned broadcasting signal of a specific channel in a transport stream type through a Vestigial SideBand (VSB) demodulation operation and an error correction operation, and a de-multiplexer that divides the received broadcasting signal into a video signal, an audio signal and all kinds of additional data and outputs the divided signals and data in a bit stream type.

Herein, the additional data is information associated with the broadcasting program, and may include Program and System Information Protocol (PSIP) information of an Advanced Television System Committee (ATSC) system, and System Information (SI) of a Digital Video Broadcasting (DVB) system.

Video data outputted through the receiver 100 is processed by the video processor 110 and is displayed on the display unit 120.

At this point, the video processor 110 includes an MPEG-2 decoder, and a scaler that changes video data to be suitable for a vertical frequency, a resolution and a screen rate that are based on the output standard of the display unit 120.

Herein, the display unit 120 may be applied to various types of display modules such as Digital Light Processing (DLP), Liquid Crystal Display (LCD) and Plasma Display Panel (PDP).

An audio signal is processed by an audio processor (not shown) and outputted through a speaker. The audio processor may include an AC-3 decoder.

The command reception unit 130 receives a command inputted from a user. That is, the command reception unit 130 receives a request command inputted from the user and transfers the received command to the controller 160 to be described below. Herein, the command reception unit 130 may be configured with an infrared receiver that receives an infrared signal inputted through a remote controller (not shown).

The storage unit 140 stores a broadcasting program received by the receiver 100, i.e., video data, audio data and additional data. At this point, the storage operation may include reserved record that is performed at a time set by a user, immediate record and a time-shift operation. Also, the storage unit 140 may be configured with a Hard Disk Drive (HDD) that is a large-capacity storage medium.

The storage unit 140 may store the video type of stored video data, and moreover, when the stored video data is 3D video data, the storage unit 140 may store a video format for replaying the 3D video data together.

The thumbnail image extraction unit 150 extracts a thumbnail image for video data that is included in a broadcasting program stored in the storage unit 140. Herein, when the video data included in the broadcasting program is 3D video data, the thumbnail image may be a still image extracted from the 3D video data.

Herein, the thumbnail image may be generated based on the video type and the set video format stored in the storage unit 140. The thumbnail image may be stored in the storage unit 140.

The controller 160 controls the overall operation of the display device.

Particularly, the controller 160 performs control for a broadcasting program received through the receiver 100 to be stored in the storage unit 140 according to a user command that is transferred through the command reception unit 130. The controller 160 determines whether the video data of the stored broadcasting program is 3D video data, and when the received video data is the 3D video data, the controller 160 allows a video format for replaying the 3D video data to be set.

The controller 160 may perform control for the set video format and the video type of the received video data to be stored in the storage unit 140.

When the controller 160 receives a replay request signal for video data that has been recorded through the command reception unit 130, it analyzes the header information of the video data to extract the video type and video format of the video data according to the replay request signal, and performs control so as to output the video data stored in the storage unit 140 to the display unit 120 according to the extracted video format.

When the received video data is the 3D video data, the controller 160 allows a thumbnail image for the 3D video data to be generated.

That is, if a broadcasting program is stored, the display device extracts and stores a thumbnail image for the stored broadcasting program in order to easily detect a replay position upon replay of the stored broadcasting program. Also, when the stored broadcasting program includes 3D video data, the display device additionally generates and stores a thumbnail image for the 3D video data.

In an embodiment, therefore, when the recorded broadcasting program includes 3D video data besides the generated thumbnail image, the display device generates a thumbnail image for the 3D video data based on a stored video type and a set video format, and thus it can allow a user to check the format information of the stored broadcasting program on the basis of the thumbnail image.

The controller 160 performs control for the generated thumbnail image to be included in a record progress state bar or a record list and displayed.

Hereinafter, an operation method in the above-described display device of recording video data according to an embodiment will be described in more detail with reference to the accompanying drawings.

Figure 2:
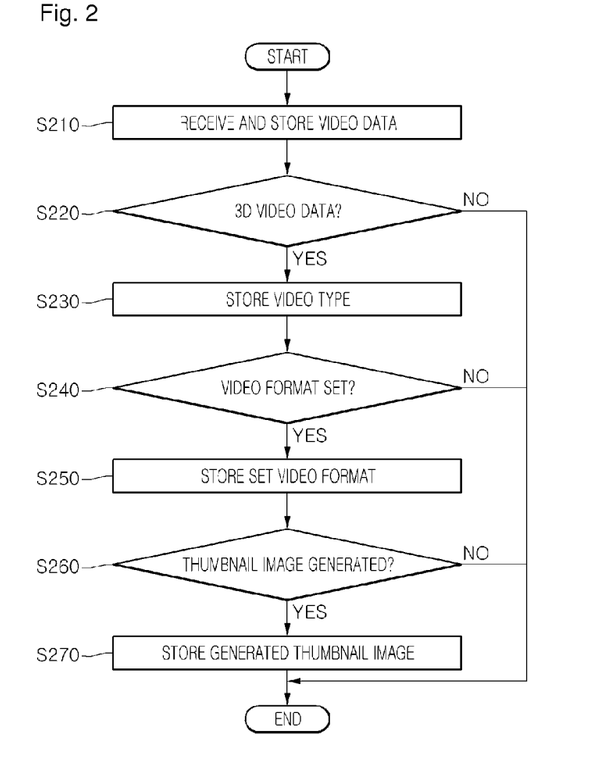
FIG. 2 is a flowchart illustrating an operation method in a display device of recording video data, according to an embodiment.

FIG. 2 is a flowchart illustrating an operation method in a display device of recording video data, according to an embodiment. That is, FIG. 2 is a flowchart for describing an operation method in a display device by stages.

Referring to FIG. 2, when a user command for requesting record that is transferred through the command reception unit 130 is inputted, the controller 160 receives a broadcasting program received through the receiver 100, i.e., video data, audio data and additional data and stores the received broadcasting program in the storage unit 140 according to the user command in operation S210.

The controller 160 determines whether the video data included in the stored broadcasting program is 3D video data in operation S220. When the video data is the 3D video data as the determined result, the controller 160 stores information, indicating that the video type of the video data is a 3D video type, in the storage unit 140 in operation S230. Herein, determining whether the video data is the 3D video data is performed through the determination of the controller 160, and the controller 160 may store video type information. Also, determining whether the video data is the 3D video data is performed through the determination of the user, and the video type information may be directly stored according to the user's input command.

When the received video data is 3D video data, the controller 160 sets a video format for replaying the 3D video data in operation S240, and it stores the set video format in the storage unit 140 in operation S250. Herein, the video format may be one of a side by side format, a top/down format, an interlaced format, a frame sequential format and a checker board format, and its detailed description will be made below.

Herein, the video type and the set video format are stored in a specific field of the video data. This will be described in more detail with reference to FIG. 3.

Figure 3:
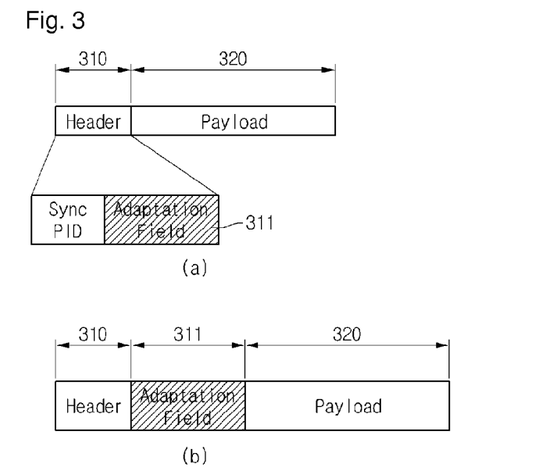
FIG. 3 is a diagram illustrating field information which is used to record and replay 3D video data, according to an embodiment.

FIG. 3 is a diagram illustrating field information which is used to record and replay 3D video data, according to an embodiment.

Referring to a portion (a) of FIG. 3, the basic structure of a packet is shown. A transport stream packet is a packet that is fundamentally composed of a header 310 region and a payload 320 corresponding to the body of raw data to be transmitted and has a fixed length of 188 bytes.

Referring to a portion (a) of FIG. 3, an adaptation field 311 is included in the header region 310. An original adaptation field is a part that accommodates additional information on each stream and null data being a stuffing byte, depending on the case.

In an embodiment, the video type information and the set video format information may be recorded in the adaptation field 311 of the header region 310. 3D video data is recorded in the payload 320.

Referring to a portion (a) of FIG. 3, the adaptation field 311 may be optionally added to the heard region 310. The video type information and the set video format information may be recorded in the adaptation field 311.

Herein, a video format for replaying 3D video data will be described below in detail with reference to FIG. 4.

Figure 4:
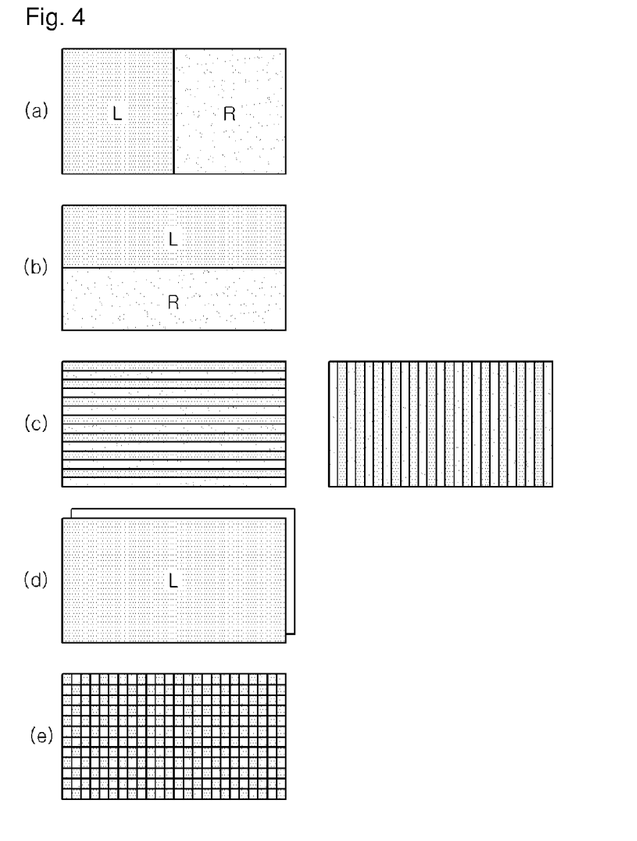
FIG. 4 is a diagram illustrating examples of a video format which is set for replaying 3D video data, according to an embodiment.

FIG. 4 is a diagram illustrating examples of a video format which is set for replaying 3D video data, according to an embodiment.

Referring to FIG. 4, as three-dimensional images, there are a stereo (or stereoscopic) image based on two points and a multi-point image based on three points.

The stereo image denote a pair of left and right images that are obtained by photographing the same subject with a left camera and a right camera that are separated by a certain distance. The multi-point image denotes three or more images that are obtained by photographing the same subject with three or more cameras having a certain distance or angle.

As transport formats of the stereo image, there are a single video stream format and a multimedia stream format. In an embodiment, the single video stream format will be described below.

As the single video stream format, there are a side by side format of a portion (a) of FIG. 4, a top/down format of a portion (b) of FIG. 4, an interlaced format of a portion (c) of FIG. 4, a frame sequential format of a portion (d) of FIG. 4 and a checker board format of a portion (e) of FIG. 4.

The side by side format of a portion (a) of FIG. 4 corresponds to a case that ½ sub-samples a left image L and a right image R in a horizontal direction, respectively disposes the sampled left and right images L and R in the left and the right, and thus generates one stereo image.

The top/down format of a portion (b) of FIG. 4 corresponds to a case that ½ sub-samples a left image L and a right image R in a vertical direction, respectively disposes the sampled left and right images L and R in an upper portion and a lower portion, and thus generates one stereo image.

The interlaced format of a portion (c) of FIG. 4 corresponds to a case that ½ sub-samples a left image L and a right image R in a vertical direction, alternately disposes the pixel of the left image L and the pixel of the right image R per line, and thus generates a stereo image, or a case that ½ sub-samples a left image L and a right image R in a horizontal direction, alternately disposes the pixel of the sampled left image L and the pixel of the sampled right image R by one pixel, and thus generates a stereo image.

The frame sequential format of a portion (d) of FIG. 4 corresponds to a case that alternately disposes a left image L and a right image R as one frame without sub-sampling the images L and R, and thus generates a stereo image.

The checker board format of a portion (e) of FIG. 4 corresponds to a case that respectively ½ sub-samples a left image L and a right image R in a vertical direction and a horizontal direction, alternately disposes the pixel of the sampled left image L and the pixel of the sampled right image R by one pixel, and thus generates a stereo image.

To again provide on a description of FIG. 2, the controller 160 stores the video format that has been set in operation S250, generates a thumbnail image of the 3D video data stored in the storage unit 140 based on the video type and the video format in operation S260, and stores the generated thumbnail image in the storage unit 140 in operation S270. Operations S260 and S270 may be optionally performed.

Figure 5:
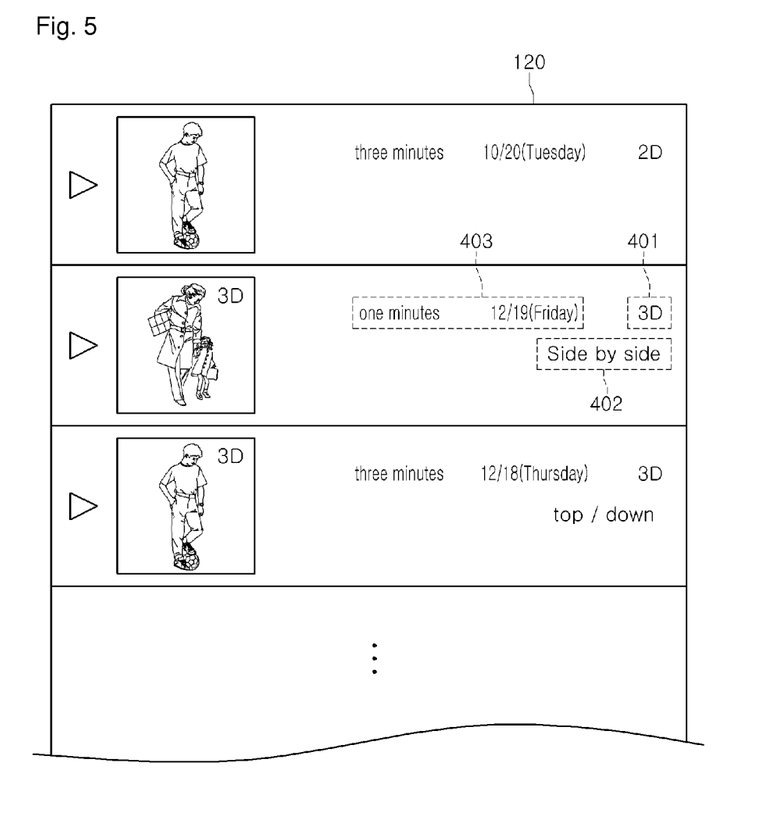
FIG. 5 is a diagram showing a record list which is generated in a method of recording video data, according to an embodiment.

FIG. 5 is a diagram showing a record list which is generated in a method of recording video data, according to an embodiment.

Referring to FIG. 5, when outputting a recorded broadcasting program list by using a time shift function, the controller 160 may output record information 403 (for example, a recorded time and a recorded date) of each broadcasting program and a thumbnail image together, and it displays both video type information 401 of video data and a video format 402 applied upon replay of the video data in order for a user to easily know whether the recorded broadcasting program is the video data of a 2D video format or the video data of a 3D video format.

According to an embodiment, as described above, by visually displaying information on 3D broadcasting at a time when 3D broadcasting is practically applied in the future, the display device provides service that allows a user to easily recognize whether a stored program is 3D video data, thereby maximizing the user's convenience.

MODE FOR THE INVENTION

Figure 6:
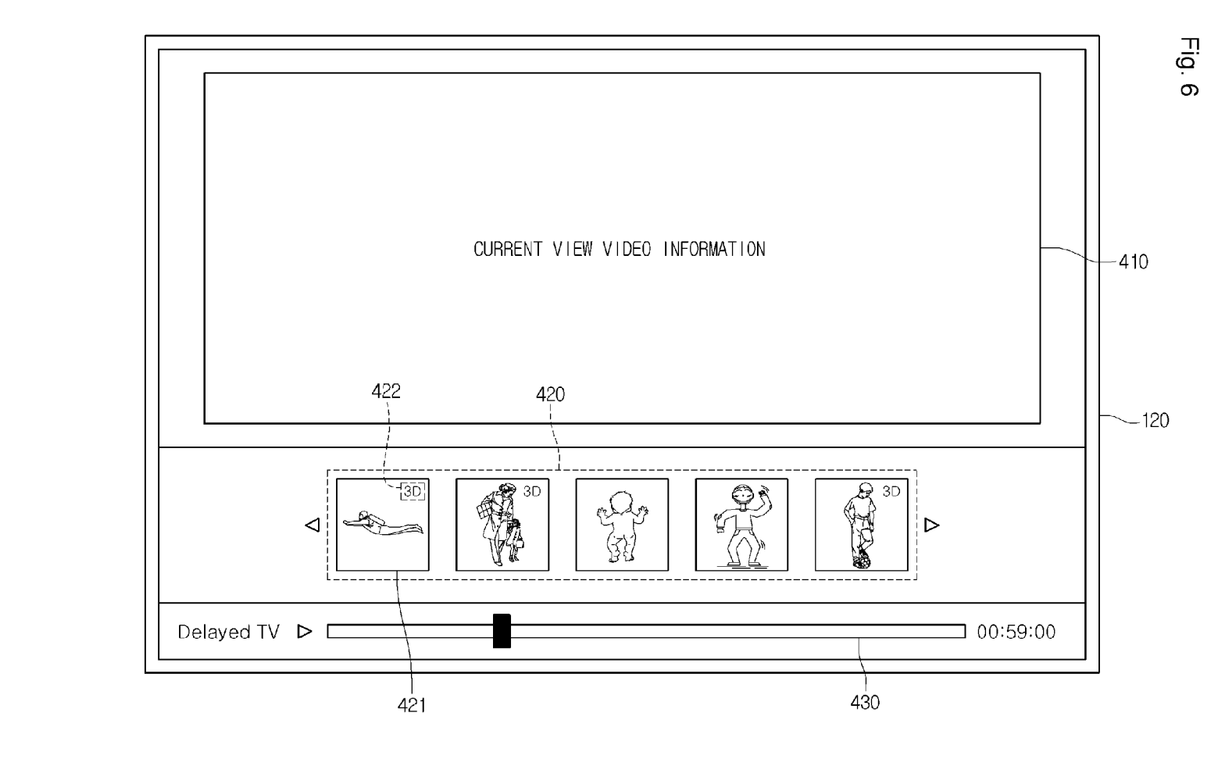
FIG. 6 is a diagram showing another example of a record list which is generated in a method of recording video data according to an embodiment.

FIG. 6 is a diagram showing another example of a record list which is generated in a method of recording video data according to an embodiment.

Referring to FIG. 6, the display unit 120 includes a replay screen region 410, a thumbnail region 420, and a replay progress state bar 430.

Thumbnail images for video data of a plurality of recorded broadcasting programs are displayed in the thumbnail region 420. Also, in the case of a thumbnail image for 3D video data among the thumbnail images, by displaying information (3D) 422 on the 3D video type together, whether the video data is 3D video data can be easily recognized.

When selecting one of the thumbnail images, video data for the selected thumbnail image may be displayed in the replay screen region 410. When selecting a thumbnail image that displays the information (3D) 422 on the 3D video type, 3D video data for the selected thumbnail image may be displayed in the replay screen region 410 based on a set video type.

While the video data for the selected thumbnail image is being displayed in the replay screen image 410, the display unit 120 may notify a user of the replay progress state of the video data (i.e., to what degree the video data has been replayed) through the replay progress state bar 430.

Figure 7:
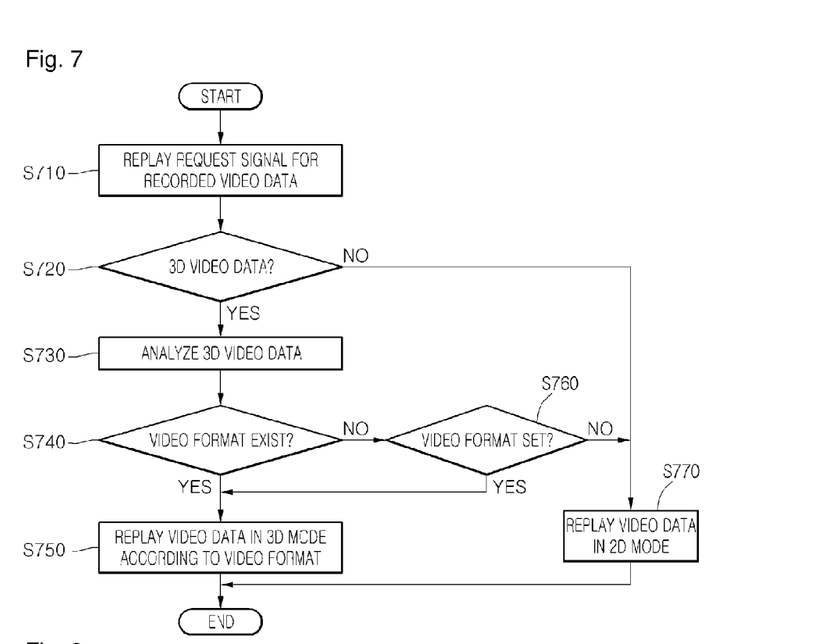
FIG. 7 is a flowchart illustrating an operation method in a display device of recording video data, according to an embodiment.

FIG. 7 is a flowchart illustrating an operation method in a display device of recording video data, according to an embodiment. That is, FIG. 7 is a flowchart for describing an operation method in a display device by stages.

Referring to FIG. 7, when the controller 160 receives a replay request signal for recorded video data that is transferred through the command reception unit 130 in operation S710, the controller 160 determines whether video data corresponding to the replay request signal is 3D video data in operation S720.

When the video data is the 3D video data as the determined result, the controller 160 extracts 3D video data stored in the storage unit 140 and analyzes the bit stream structure of the 3D video data in operation S730. The controller 160 determines whether the video type and video format of the 3D video data exist in a specific region (for example, a header region) among the bit stream structure of the 3D video data in operation S740, and when the video format set upon storing of the 3D video data exists, the controller 160 replays the 3D video data according to the set video format in operation S750.

When the video format for replaying the 3D video data is not stored as the analyzed result of operation S730, the controller 160 newly sets a video format for the 3D video format in operation S760, and replays the 3D video data according to the newly-set video format in operation S750. When the video format for the 3D video data is not newly set or when the video data is 2D video data as the determined result of operation S720, the controller 160 replays the video data in a 2D mode in operation S770.

Figure 8:
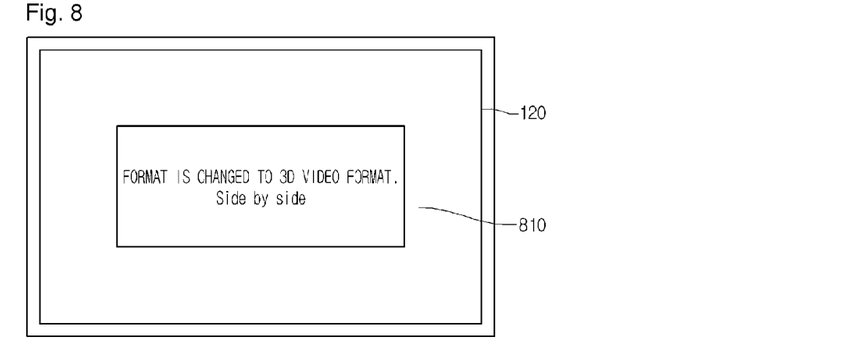
FIGS. 8 and 9 are diagrams illustrating an example of popup screen which is provided when replaying video data in a method of replaying video data according to an embodiment.
Figure 9:
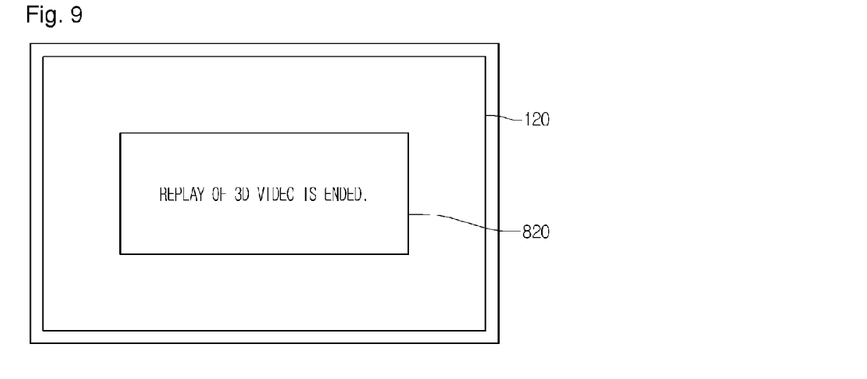

FIGS. 8 and 9 are diagrams illustrating an example of popup screen which is provided when replaying video data in a method of replaying video data according to an embodiment.

Referring to FIG. 8, when displaying the 3D video data on the display unit 120 according to a set video format, information on the video format of the displayed 3D video data may be displayed on the display unit 120 through a popup window 810.

Referring to FIG. 9, when the display of the 3D video data is ended, a popup window 820 representing the display end of the 3D video data may be displayed on the display unit 120.

The method of recoding video data and the method of replaying video data according to embodiments may be manufactured as programs executable in computers and be stored in a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method of operating video data in a display device, the method comprising:
   receiving a broadcasting program from the outside, the broadcasting program including a video data;
   storing the video data included in the broadcasting program in response to a record request command;
   determining whether the stored video data is Three-Dimensional (3D) video data;
   storing a 3D display information indicating that the stored video data is a 3D video type if the stored video data is a 3D video data;
   setting one of a side by side format, a top/down format, an interlaced format, a frame sequential format and a checker board format as a video format for replaying the 3D video data, and
   generating a thumbnail image of the stored video data based on the 3D display information and the set video format, the thumbnail image being displayed with the 3D display information and information on the set video format.

2. The method according to claim 1, further comprising:
   storing the set video format; and
   storing the generated thumbnail image.

3. The method according to claim 1, wherein the thumbnail image is a still image that is extracted from the 3D video data when the stored video data is the 3D video data.

4. The method according to claim 1, wherein at least one of the video type information and the video format information is included in a header region of a packet.

5. The method according to claim 1, wherein the thumbnail image is comprised in a record list and outputted.

6. The method according to claim 1, wherein the thumbnail image is comprised in a record progress state bar for notifying a record progress state and outputted.

7. The method according to claim 1, further comprising:
displaying a record list including thumbnail images; and
replaying video data corresponding to the thumbnail image selected by a selection command.

8. The method according to claim 7, wherein when replaying the 3D video data, information on a video format of the replayed 3D video data is displayed through a popup window.

9. The method according to claim 7, wherein when replay of the 3D video data is ended, the replay end of the 3D video data is displayed through a popup window.

10. A display device comprising:
a receiver configured to receive a broadcasting program from the outside, the broadcasting program including a video data;
a controller configured to determine whether the received video data is Three-Dimensional (3D) video data, and to set one of a side by side format, a top/down format, an interlaced format, a frame sequential format and a checker board format as a video format for replaying the 3D video;
a thumbnail image generation unit configured to generate a thumbnail image of the received video data based on a 3D display information and the set video format, the 3D display information indicating that the received video data is a 3D video data and the thumbnail image being displayed with 3D display information and information on the video format.

11. The device according to claim 10, further comprising:
a storage unit storing the video data included in the broadcasting program in response to a record request command, storing the 3D display information, storing the set video format, and storing the generated thumbnail image; and a display unit outputting the video data.

12. The device according to claim 10, wherein the thumbnail image is a still image that is extracted from the 3D video data when the stored video data is the 3D video data.

13. The device according to claim 10, wherein at least one of the video type information and the video format information is included in a header region of a packet.

14. The device according to claim 10, wherein the thumbnail image is comprised in a record list and outputted.

15. The device according to claim 10, wherein the thumbnail image is comprised in a record progress state bar for notifying a record progress state and outputted.

16. The method according to claim 10, wherein the controller is configured to:
display a record list including thumbnail images; and
replay video data corresponding to the thumbnail image selected by a selection command.

17. The device according to claim 10, wherein when replaying the 3D video data, information on a video format of the replayed 3D video data is displayed through a popup window.

18. The device according to claim 10, wherein when replay of the 3D video data is ended, the replay end of the 3D video data is displayed through a popup window.

* * * * *